(12) United States Patent
Graubmann

(10) Patent No.: US 11,597,251 B2
(45) Date of Patent: Mar. 7, 2023

(54) THERMAL MANAGEMENT UNIT, THERMAL MANAGEMENT SYSTEM, AND AN ELECTRICAL VEHICLE INCLUDING THE THERMAL MANAGEMENT SYSTEM

(71) Applicant: Ymer Technology AB, Stockholm (SE)

(72) Inventor: Josef Graubmann, Greifenberg am Ammersee (DE)

(73) Assignee: Ymer Technology AB, Stockholm (SE)

( * ) Notice: Subject to any disclaimer, the term of this patent is extended or adjusted under 35 U.S.C. 154(b) by 13 days.

(21) Appl. No.: 17/465,448

(22) Filed: Sep. 2, 2021

(65) Prior Publication Data

US 2022/0118816 A1    Apr. 21, 2022

(30) Foreign Application Priority Data

Oct. 15, 2020 (EP) ..................................... 20202112

(51) Int. Cl.
*B60H 1/32* (2006.01)
*B60H 1/00* (2006.01)

(52) U.S. Cl.
CPC ..... *B60H 1/00278* (2013.01); *B60H 1/00392* (2013.01); *B60H 1/3228* (2019.05); *B60H 2001/00307* (2013.01)

(58) Field of Classification Search
CPC .............. B60H 1/00278; B60H 1/3228; B60H 1/00392; B60H 2001/00307
USPC ........................................................ 62/239
See application file for complete search history.

(56) References Cited

U.S. PATENT DOCUMENTS 7,789,176 B2    9/2010   Zhou
2016/0107502 A1    4/2016   Johnston

FOREIGN PATENT DOCUMENTS

| CN | 107351634 | * | 11/2019 |
| DE | 19625927 A1 | | 1/1998 |
| GB | 2558914 A | | 7/2018 |
| JP | WO2014148024 | * | 9/2014 |
| JP | WO2015107589 | * | 7/2015 |

OTHER PUBLICATIONS

Extended European Search Report; Application No. 20202112.7; Completed: Mar. 29, 2021; dated Apr. 8, 2021; 6 Pages.

* cited by examiner

*Primary Examiner* — Davis D Hwu
(74) *Attorney, Agent, or Firm* — Whitmyer IP Group LLC

(57) ABSTRACT

A thermal management unit for controlling the temperature in an electric vehicle, a thermal management system including the unit and an electric vehicle including the thermal management system. The unit includes a heater, a cooling unit, a heat exchanger, six input ports and six output ports for connecting external pipes, three three-way valves, a two-way valve and piping for thermal fluid. The components of the thermal management unit are connected via piping such that excess heat from a vehicle component can be directed to heat the cabin and/or energy storage system of the electric vehicle. Also, one heater and one cooling unit are used to heat or cool both the cabin and the energy storage system.

15 Claims, 9 Drawing Sheets

THERMAL MANAGEMENT UNIT, THERMAL MANAGEMENT SYSTEM, AND AN ELECTRICAL VEHICLE INCLUDING THE THERMAL MANAGEMENT SYSTEM

TECHNICAL FIELD

The present disclosure relates to a thermal management unit for controlling the temperature in an electric vehicle. The present disclosure also relates to a thermal management system and an electrical vehicle including the thermal management system.

BACKGROUND

Electric vehicles are becoming more and more popular. On the one hand side they are preferable for environmental reasons, by avoiding fossil fuels, and on the other hand side they are, most of the cases, preferred in regard to reduced total cost of ownership.

Cars are not the only type of vehicle that can be an electric vehicle. For example, boats, trucks, locomotives, airplanes and heavy-duty vehicles are also available as electrical vehicles.

Electric vehicles are usually powered by an energy storage system. The energy storage system here being defined as any kind of battery, battery pack or series of batteries for powering the electric vehicle.

For the usability of electric vehicles, it is important that the energy storage system has a long lifetime, i.e. a large number of charge/discharge cycles possible before the cells fail to operate satisfactorily. Keeping the energy storage system in an optimal temperature range is essential to maximize the lifetime.

Besides improving the energy storage system lifetime, keeping the energy storage system within the optimal temperature range during operation ensures that the energy storage system deliver as much power as possible.

As well as keeping the energy storage system at an optimal temperature, the temperature in the cabin, where the operator and passengers of the vehicle are housed, should also be regulated.

There are many systems for managing temperatures in the energy storage system and the cabin. For example in U.S. Pat. No. 7,789,176B2, a thermal management system is presented which has a cooling loop for cooling the drive motor, a refrigeration subsystem which provides cooling to a heat exchanger, an energy storage cooling subsystem with a coolant cooled via heat transfer in the heat exchanger, and a HVAC subsystem that provides temperature control for the vehicle's passenger cabin. The HVAC subsystem is also coupled to the heat exchanger for its coolant to be cooled by the refrigeration subsystem and to the cooling loop for cooling the drive motor for its coolant to be heated by the cooling loop. In this solution, heat in the cooling loop for the drive motor can be used for heating the cabin and cold from the refrigeration subsystem can be used to cool both the energy storage system and the cabin. The energy storage cooling subsystem also has a heater if the energy storage system needs heating.

In an electric vehicle, the power for heating and cooling comes from the energy storage system. Therefore, it is essential that the thermal management is as energy efficient as possible so that more of the power of the energy storage system can be used for operating the electric vehicle.

Another important aspect of thermal management in an electric vehicle is that it takes up space in the vehicle as well as increases the weight. A space efficient and weight optimized thermal management system is therefore preferable.

SUMMARY

It is an aim of the present disclosure to provide a thermal management unit, a thermal management system and an electric vehicle comprising the thermal management system, for controlling the temperature in an electric vehicle, which is energy efficient and minimizes space and weight in the electric vehicle.

This aim is achieved by a thermal management unit as defined in the claims.

The disclosure provides a thermal management unit for controlling the temperature in an electric vehicle, the unit comprising:
a. a heater for heating thermal fluid,
b. a cooling unit,
c. a heat exchanger,
d. a first input port, a second input port, a third input port, a fourth input port, a fifth input port and a sixth input port for connecting external pipes to receive thermal fluid,
e. a first output port, a second output port, a third output port, a fourth output port, a fifth output port, and a sixth output port for connecting external pipes to output thermal fluid,
f. a first three-way valve comprising an inlet, a first outlet and a second outlet, a second three-way valve comprising an inlet, a first outlet and a second outlet, and a third three-way valve comprising an inlet, a first outlet and a second outlet,
g. a two-way valve comprising an inlet and an outlet,
h. piping for thermal fluid, The first input port is connected via the piping to the inlet of the first three-way valve.

The first outlet of the first three-way valve is connected via the piping to the first output port and the second outlet of the first three-way valve is connected via the piping to the input port of the second three-way valve via the heater.

The first outlet of the second three-way valve is connected via the piping to the second output port and the second outlet of the second three-way valve is connected via the piping to the inlet of the two-way valve via the heat exchanger. The outlet of the two-way valve is connected via the piping to the first output port.

The piping between the heat exchanger and the inlet of the two-way valve is also connected to the second input port and to the piping between the second outlet of the first three-way valve and the heater.

The third input port is connected via the piping to the third output port.

The fourth input port is connected via the piping to the inlet of the third three-way valve. The first outlet port of the third three-way valve is connected to the piping between the third input port and the third output port via the heat exchanger, and the second outlet of the third three-way valve is connected via the piping to the fourth output port.

The fifth input port is connected via the piping to the fifth output port and to the sixth output port via the heat exchanger and the cooling unit, wherein the sixth input port is connected to the piping between the heat exchanger and the cooling unit.

These parts are thus arranged in the thermal management unit. The unit is thus ready to be installed in an electric vehicle for providing efficient cooling and heating of the cabin and the battery as well as cooling of any other, external, components. An advantage with the unit is that an efficient thermal management unit can be installed in an electric vehicle efficiently in one unit. It is thus both energy efficient and space efficient.

The thermal management unit is arranged with pipes and valves so that excess heat from cooling a vehicle component can be used to heat both the cabin and an energy storage system. The first three-way valve makes it possible to direct flow of thermal fluid with excess heat from cooling a vehicle component to the heater so that the heater can use less power, or alternatively, to direct the thermal fluid to circle back to cooling of the vehicle component. The second three-way valve makes it possible to direct flow of thermal fluid from the heater to either the cabin or to the energy storage system or to both. The third three-way valve makes it possible to direct flow of thermal fluid so that the energy storage system is cooled by a passive cooling system in the vehicle or by the cooling unit, via the heat exchanger. The two-way valve makes it possible, together with the first three-way valve, to separate the cooling of a vehicle component from the heating of the cabin and/or the energy storage system in case there is no excess heat in from cooling the vehicle component.

In the cabin, the heating is done via a cooling and heating unit, e.g. heating, ventilation, and air conditioning, HVAC, unit. The HVAC unit is thus arranged in the cabin. The same heater in the unit is used to heat both the cabin and the energy storage system. The same cooling unit is also used for cooling both the cabin and the energy storage system. By minimizing the number of heaters and cooling units, the weight of the unit is minimized. Since, during operation of the electric vehicle, it is the energy storage system that powers the heater and the cooling unit, it is also an advantage for the power consumption of the energy storage system that only one heater and only one cooling unit is used for all heating and cooling.

According to some aspects, the thermal management unit comprises a casing and wherein all components of the thermal management unit are arranged in the casing, and wherein the input ports and output ports are openings in the casing. When the thermal management unit has all components housed in a casing, an easy to handle and easy to install unit is provided. In other words, a plug and play solution is achieved.

According to some aspects, the thermal management unit comprises a seventh input port for connecting external pipes to receive thermal fluid and a seventh output port for connecting external pipes to output thermal fluid, the seventh input port is so connected via the piping to the seventh output port via a first pump. The thermal management unit may thus comprise at least one pump. The pump is used to pump thermal fluids in the piping. With at least one pump in the unit, the need for external pumps is reduced or eliminated.

According to some aspects, the second outlet of the first three-way valve is connected via the piping to the input port of the second three-way valve via a second pump and the heater. With this, at least one pump is arranged in the unit for controlling the flow of thermal fluid.

According to some aspects, the third input port is connected via the piping to the third output port via a third pump. With this, at least one pump is arranged in the unit for controlling the flow of thermal fluid.

Accordingly, there are several possible placements for pumps in the unit. The unit may be without a pump, then a pump may be needed externally of the thermal management unit. The unit may have one or more of the above pumps. The unit may also have more pumps than described above.

In the thermal management unit, there may also be arranged one or more temperature sensors. The sensors may be used in a control system for determining how to control opening and closing of valves and speed of any pumps in the unit. The temperature sensors described below may be added to the unit independently of each other or may be external to the disclosed unit.

According to some aspects, the thermal management unit comprises a first temperature sensor arranged to sense the temperature of the thermal fluid in the piping between the first input port and the inlet of first three-three-way valve. The first input port is intended to be connected to piping comprising thermal fluid which has been used to cool a vehicle component. With a temperature sensor arranged to sense the temperature of the thermal fluid, a control unit may control the first three-way valve to direct excess heat from the vehicle component to the heater and to the cabin or energy storage system. It should be noted that there may be one or more temperature sensors present in the cooling system of the vehicle component. There is then no need for a temperature sensor in the unit for detecting the same temperature.

According to some aspects, the thermal management unit comprises a second temperature sensor arranged to sense the temperature of the thermal fluid in the piping between the first outlet of the second three-way valve and the second output port. With this temperature sensor, the temperature of the thermal fluid to be connected to the cabin can be monitored. It should be noted that this temperature sensor may be arranged externally of the thermal management unit, for example in an HVAC system of the cabin. If the temperature here is higher than necessary, the heater may be instructed to heat less or, alternatively, the second outlet of the first three-way valve may be closed and/or the first outlet of the second three-way valve may be closed.

According to some aspects, the thermal management unit comprises a third temperature sensor arranged to sense the temperature of the thermal fluid in the piping between the third input port and the third output port. The temperature of the thermal fluid to the energy storage system can thus be monitored.

According to some aspects, the thermal management unit comprises a fourth temperature sensor arranged to sense the temperature of the thermal fluid in the piping between the fourth input port and the inlet of the third three-way valve. The temperature of the thermal fluid from the energy storage system can thus be monitored.

According to some aspects, the thermal management unit comprises a fifth temperature sensor arranged to sense the temperature of the thermal fluid in the piping between the seventh input port and the first pump. The temperature of the thermal fluid to the vehicle component can thus be monitored.

According to some aspects, the thermal management unit comprises a thermal expansion valve arranged between the fifth input port and the heat exchanger. The thermal expansion valve controls the amount of refrigerant released into the evaporator, which is a part of the heat exchanger and is intended to regulate the superheat of the vapor leaving the evaporator. The thermal expansion valve may also be integrated in the heat exchanger or a thermal expansion valve may be arranged externally before the fifth input port. The thermal expansion valve can be pressure controlled or electrical controlled. It can be electrically engaged (normally closed or normally open) or just pressure engaged.

In the thermal management unit, there may also be arranged one or more pressure sensors. The pressure sensors may be used in a control system for determining how to control any thermal expansion valves in the unit as well as the cooling unit, in the case it comprises a compressor which is described further below, and associated condenser-fans. The pressure sensors described below may be added to the unit independently of each other.

According to some aspects, the thermal management unit comprises a first pressure sensor arranged to sense the pressure of the thermal fluid in the piping between the fifth input port and both of the fifth output port and the heat exchanger. The pressure sensor is indicative of the temperature if the piping is transporting refrigerant gas. The pressure sensor may also be arranged externally before the fifth input port. A control unit can use input from the pressure sensor to control the thermal expansion valve and/or the cooling unit.

According to some aspects, the thermal management unit comprises a second pressure sensor arranged to sense the pressure of the thermal fluid in the piping between the cooling unit and both of the sixth input port and the heat exchanger. A control unit can use input from the pressure sensor to control the cooling unit.

According to some aspects, the first input port comprises a plurality of first input ports all connected via the piping to the inlet of the first three-way valve. This is useful in a case where the vehicle component of the electric vehicle comprises more than one component with separate cooling piping 4a, 4b, . . . , 4n. Then each one can be connected individually to the thermal management unit.

According to some aspects, the seventh output port comprises a plurality of seventh output ports.

The aim is also achieved by a thermal management system as defined in the claims.

The thermal management system comprises the thermal management unit, and a control unit arranged to control the opening and closing of the inlet and outlets of the first three-way valve, the inlet and outlets of the second three-way valve, the inlet and outlets of the third three-way valve, and the inlet and outlet of the two-way valve. The control unit can be arranged in the thermal management unit or in the vehicle.

It is an aim of the present disclosure to improve thermal management of an electric vehicle including a cabin, an energy storage system, a vehicle component, vehicle piping for thermal fluid, a passive cooling system and the thermal management system.

This aim is achieved by an electric vehicle as defined in the claims.

The electric vehicle comprises a cabin, an energy storage system, a vehicle component, vehicle piping for thermal fluid, a passive cooling system and the thermal management system. The first input port is connected via the vehicle piping to the first output port via the vehicle component and the passive cooling system. The second input port is connected via the vehicle piping to the second output port via the cabin. The third input port is connected via the vehicle piping to the fourth output port via the passive cooling system. The fourth input port is connected via the vehicle piping to the third output port via the energy storage system. The fifth input port is connected via the vehicle piping to the sixth output port via the passive cooling system. The sixth input port is connected via the vehicle piping to the fifth output port via the cabin.

The vehicle component can be any component of the electric vehicle that requires cooling with a thermal fluid.

For example, the vehicle component can be one or more parts of the power train, any kind of e-motor, inverter or DC/DC converter.

The thermal management unit and system makes it possible to use the thermal fluid that has been used for cooling the vehicle component to heat the cabin and the energy storage system of the electrical vehicle. Thus, the use of energy from the energy storage system for heating the cabin and the energy storage system is reduced. Accordingly, the energy in the energy storage system will last longer, and the energy storage system needs to be charged less frequently.

BRIEF DESCRIPTION OF THE DRAWINGS

The invention will now be explained more closely by the description of different aspects and with reference to the appended figures.

DETAILED DESCRIPTION

Figure 1:
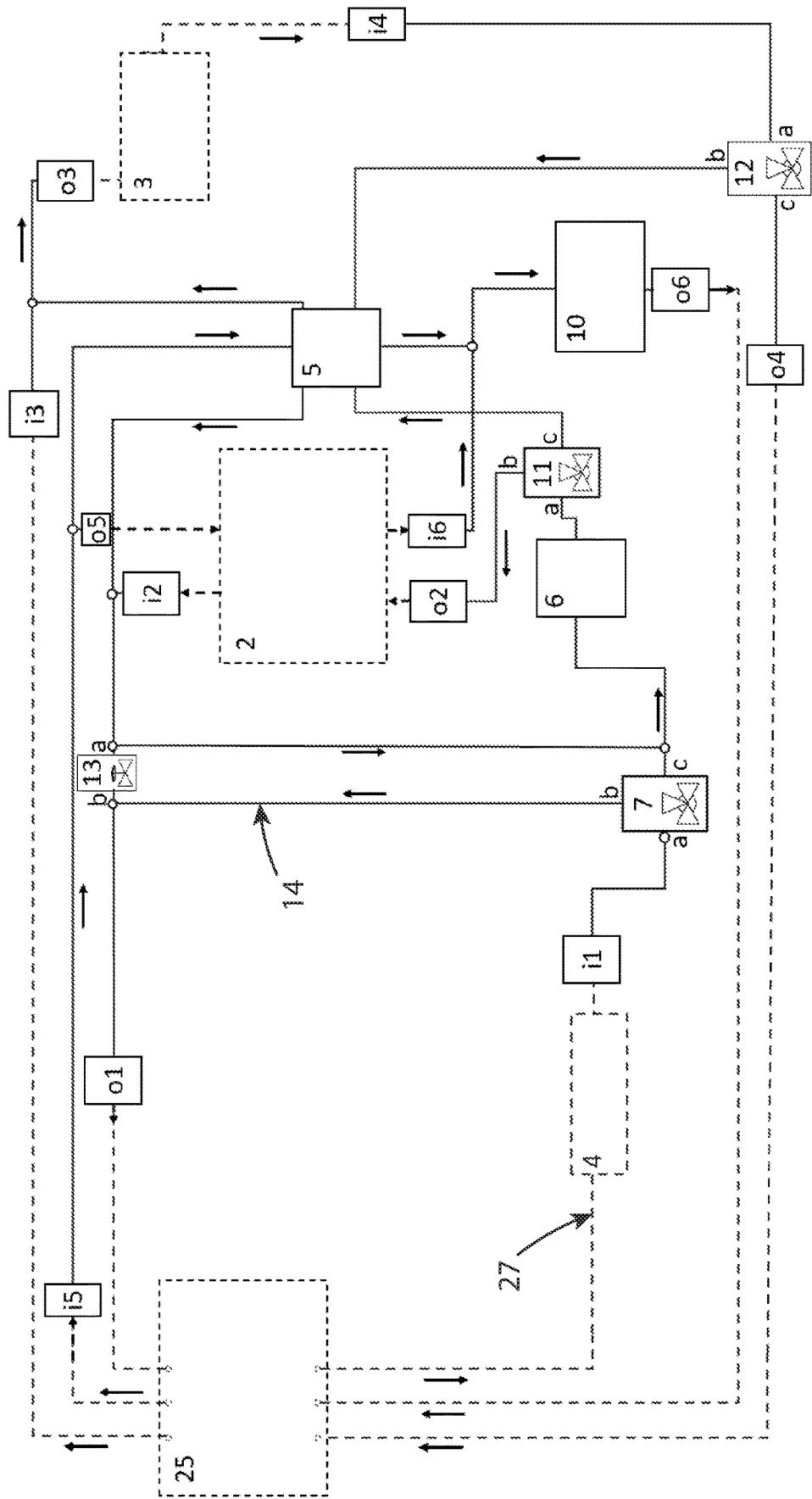
FIG. 1 shows a schematic diagram of an example thermal management unit.

The present invention is not limited to the embodiments disclosed but may be varied and modified within the scope of the following claims. For example, pumps, temperature sensors and pressure sensors may be added to many different places in the thermal management unit. Some examples of where it may be advantageous to add pumps, temperature sensors and/or pressure sensors are described below.

Aspects of the present disclosure will be described more fully hereinafter with reference to the accompanying drawings. The thermal management unit disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the disclosure. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this disclosure belongs.

A vehicle component is any component of the electric vehicle that requires cooling with a thermal fluid. For example, the vehicle component can be one or more parts of the power train, any kind of e-motor, inverter or DC/DC converter.

As also stated in the background section, an energy storage system is herein being defined as any kind of battery pack or series of batteries for powering the electric motor of the electric vehicle and the electric vehicle itself. In other words, when the term energy storage system is used in this disclosure, any kind of energy storage system for electric vehicles is included, for example a plurality of batteries. An energy storage system for an electric vehicle usually comprises several batteries in series, and those batteries are normally based on battery packs which are based on single battery cells.

The disclosure provides a thermal management unit 1 for controlling the temperature in an electric vehicle. FIG. 1 shows a schematic diagram of an example thermal management unit 1. It should be noted that components of the thermal management unit 1 described herein may be powered by an energy storage system 3 of the electric vehicle, by an external power source if one is connected to the electric vehicle or, alternatively, the thermal management unit 1 may comprise its own energy storage system.

In the FIG. 1, a cooling and heating set up in an electric vehicle is illustrated. The dotted lines illustrate parts that are not included in the thermal management unit 1 but in the electric vehicle. The continuous lines illustrate the parts that are part of the thermal management unit 1. Hence, the dotted lines are illustrating how the thermal management unit 1 is intended to be connected to the electric vehicle. The parts with dotted lines are explained further below. The parts of the dotted lines are not part of the thermal management unit and may be connected differently than illustrated here. What is explained below is how it is recommended that the vehicle components are to be connected to the thermal management unit, but it may be that they can be connected differently. The external parts are described so that the disclosure is easier to understand.

The lines connecting the various components represents piping 14 for thermal fluid. The arrows illustrated in connection to the piping 14 in the figures are to show the intended flow direction of thermal fluids in the pipes. The piping 14 comprises any kind of piping 14 suitable to hold thermal fluid. Depending on the thermal fluid to use, the piping 14 may comprise, for example, plastic piping, metal piping or rubber piping.

The unit comprises a heater 6 for heating thermal fluid. The heater 6 is for example a high voltage heater, a Low-Voltage resistor heater or PTC-type heater or an AC-powered heater. It could be also the condensing part of a heat-pump system. The heater 6 may be any heater for heating thermal fluids suitable to be arranged in an electric vehicle.

The unit comprises a cooling unit 10. The cooling unit 10 is for example a compressor which, together with a thermal expansion valve arranged in association with an evaporator or a heat exchanger forms a refrigeration machine. In such a case, thermal vapor is used for the cooling. The cooling unit may also be a heat-pump system.

The unit comprises a heat exchanger 5. The heat exchanger 5 is arranged to transfer thermal energy from a thermal fluid to another thermal fluid, or from one fluid to several fluids. The heat exchanger 5 is, for example, a chiller. A chiller is a plate-to-plate heat exchanger that transfers thermal energy from a thermal fluid to another thermal fluid, or from one thermal fluid to several thermal fluids.

To connect the components of the thermal management unit 1 with external units and piping 14, the unit comprises a first input port i1, a second input port i2, a third input port i3, a fourth input port i4, a fifth input port i5 and a sixth input port i6, for connecting external pipes to receive thermal fluid.

The unit also comprises a first output port o1, a second output port o2, a third output port o3, a fourth output port o4, a fifth output port o5 and a sixth output port o6 for connecting external pipes to output thermal fluid.

In other words, the input ports and output ports provide places to connect external piping for receiving and providing thermal fluid to and from the thermal management unit 1. Another term for external piping is vehicle piping 27.

To be able to control the flows of the thermal fluids, the thermal management unit 1 comprises several valves: a first three-way valve 7 comprising an inlet 7a, a first outlet 7b and a second outlet 7c, a second three-way valve 11 comprising an inlet 11a, a first outlet 11b and a second outlet 11c, a third three-way valve 12 comprising an inlet 12a, a first outlet 12b and a second outlet 12c, and a two-way valve 13 comprising an inlet 13a and an outlet 13b.

As can be seen in FIG. 1, the first input port i1 is connected via the piping 14 to the inlet 7a of the first three-way valve 7. The first input port is intended to receive thermal fluid that has been used to cool the vehicle component 4 of the electric vehicle.

The first outlet 7b of the first three-way valve 7 is connected via the piping 14 to the first output port o1. The thermal fluid can from the first output port o1, be circled back to the cooling of the vehicle component 4. When connected to the external parts, a first thermal fluid loop is created where thermal fluid can be circulated to cool the vehicle component 4. The vehicle component 4 is for example cooled via a passive cooling system 25 which cools the thermal fluid via the ambient air and possibly with the help of one or more fans. Vehicles are often, at least in part, cooled using ambient air. The system for cooling thermal fluid using ambient air is the passive cooling system 25. The thermal fluid for cooling the vehicle component 4 is for example cooled via a low-temperature radiator in the passive cooling system 25.

The second outlet 7c of the first three-way valve 7 is connected via the piping 14 to the input port 11a of the second three-way valve 11 via the heater 6. The first three-way valve 7 can thus pass thermal fluid to the first output port o1 and/or to the second three-way valve 11, via the heater 6.

The first outlet 11b of the second three-way valve 11 is connected via the piping 14 to the second output port o2 and the second outlet 11c of the second three-way valve 11 is connected via the piping 14 to the inlet 13a of the two-way valve 13 via the heat exchanger 5. The outlet 13b of the two-way valve 13 is connected via the piping 14 to the first output port o1. The second output port o2, is intended to be connected to a heating system in the cabin 2 of the electric vehicle.

The piping 14 between the heat exchanger 5 and the inlet 13a of the two-way valve 13 is also connected to the second input port i2 and to the piping 14 between the second outlet 7c of the first three-way valve 7 and the heater 6. Hence, if the two-way valve 13 is closed, the thermal fluid will be circled back to the heater 6.

With the above components, two loops for thermal fluid are created. The two loops can be connected to re-use abundant heat in the thermal fluid after or during cooling of the vehicle component 4. The first loop goes via the first input port i1, the inlet 7a of the first three-way valve 7, the first outlet 7b of the first three-way valve 7 and first output port o1 and then via the external piping 27 and cooling system 25—which also can be bypassed by using another three-way valve or a thermally controlled type of valve— and cooling of the vehicle component 4 and back to the first input port i1. The second loop is where thermal fluid is circulated via the heater 6 and selectively via the cabin 2 heating system and/or the heat exchanger 5 for heating the energy storage system 3 of the electric vehicle and then back to the heater 6.

The two loops can be joined via the first three-way valve 7 and the two-way valve 13 and are intended to be joined when the cabin 2 or the energy storage system 3 are heated and there is excessive heat in the thermal fluid from the vehicle component 4. The thermal fluid from cooling the vehicle component 4 can thus be passed on to the heater 6. This is beneficial if the thermal fluid is warmer than the thermal fluid that has been circulated through the heater 6. It is also beneficial if the thermal fluid from the second outlet 7c is warmer than the fluid after the second input port i2. Then the heater does not need to reheat the thermal fluid from the low i2 temperature but can use the warmer fluid from the second outlet 7c.

For cooling and heating the energy storage system 3 via the heat exchanger 5, the third input port i3 is connected via the piping 14 to the third output port o3 and the fourth input port i4 is connected via the piping 14 to the inlet 12a of the third three-way valve 12. The first outlet port 12b of the third three-way valve 12 is connected to the piping 14 between the third input port i3 and the third output port o3 via the heat exchanger 5, and the second outlet 12c of the third three-way valve 12 is connected via the piping 14 to the fourth output port o4. The external passive cooling system 25 is intended to be connected between the third input port i3 and the fourth output port o4. The passive cooling system 25 is thus intended to cool the thermal fluid which is to cool the energy storage system. Via the third three-way valve 12, the thermal fluid may also pass the heat exchanger 5 for heating or cooling via the heat exchanger 5.

For cooling the cabin 2 and/or the energy storage system 3, the fifth input port i5 is connected via the piping 14 to the fifth output port o5 and to the sixth output port o6 via the heat exchanger 5 and the cooling unit 10, wherein the sixth input port i6 is connected to the piping 14 between the heat exchanger 5 and the cooling unit 10. An external cooling system in the cabin 2 is intended to be connected between the fifth output port o5 and the sixth input port i6. The passive cooling system 25 is intended to be connected between the sixth output port o6 and the fifth input port i5. In the case where the cooling unit 10 is a compressor as explained above, the passive cooling system 25 comprises a condenser.

With this, the cooling unit 10 can be used to either cool the cabin 2 or the energy storage system 3, via the heat exchanger 5.

These parts are thus arranged in the thermal management unit 1. The unit is thus ready to be installed in electric vehicles for providing efficient cooling and heating of the cabin 2 and the energy storage system 3. An advantage with the unit is that an efficient thermal management unit can be installed in an electric vehicle efficiently in one unit. It is thus both energy efficient and space efficient.

The thermal management unit 1 is arranged with pipes and valves so that excess heat from cooling the vehicle component 4 can be used to heat both a connected cooling and heating unit in the cabin 2 and the energy storage system 3. The same heater 6 in the unit is used to heat both the cabin 2 and the energy storage system 3. The same cooling unit 10 is also used for cooling both the cabin 2 and the energy storage system 3. By minimizing the number of heaters and cooling units, the weight of the unit is minimized.

Figure 2:
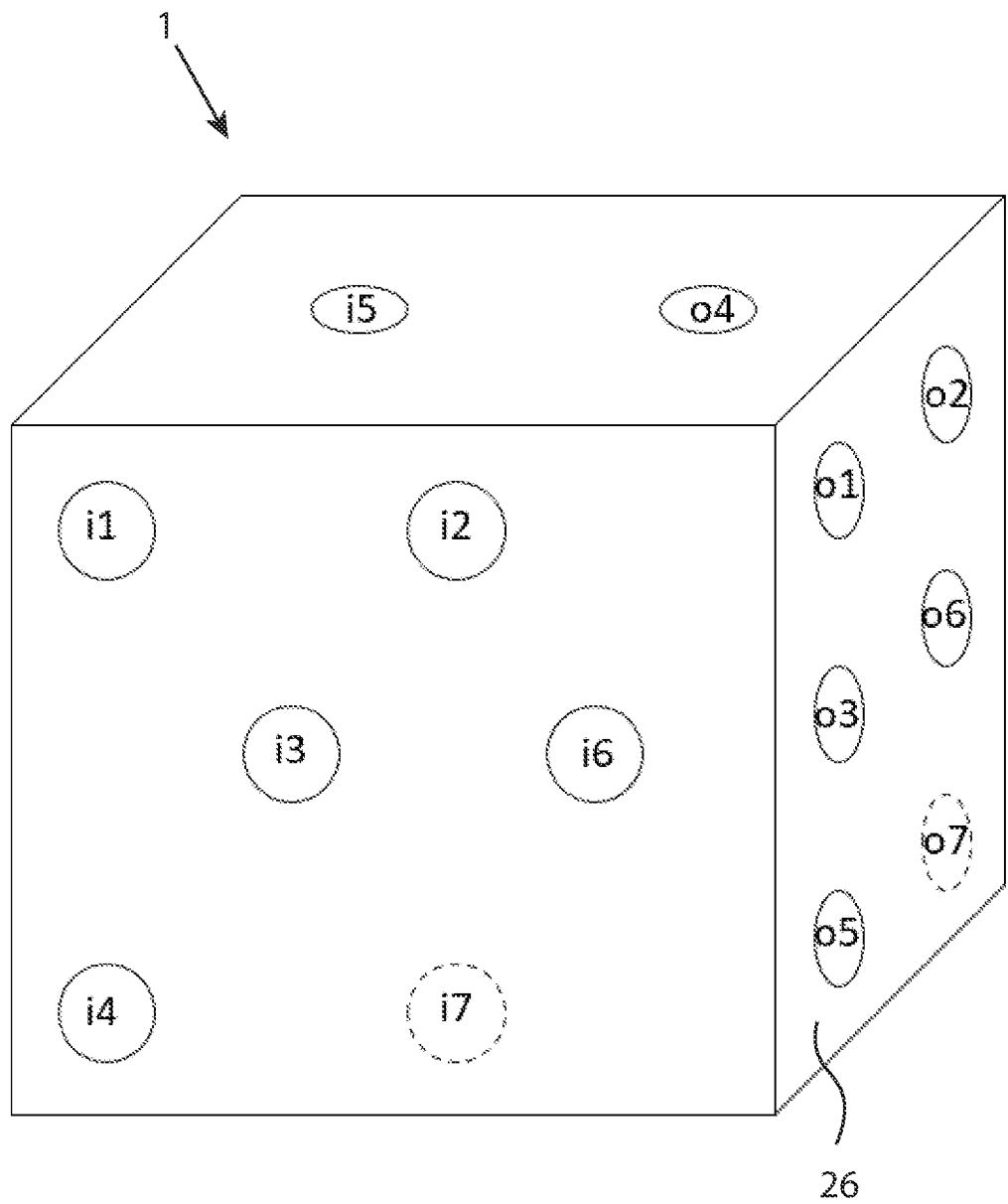
FIG. 2 shows an example of a thermal management unit from the outside.

In FIG. 2 it is illustrated how the unit may look from the outside. Of course, the unit may have different shapes. In the illustrated example, the thermal management unit 1 comprises a casing 26 and all components of the thermal management unit 1 are arranged in the casing 26. In this case, the input ports i1-i6 and output ports o1-o6 are openings in the casing 26. When the thermal management unit 1 has all components housed in a casing 26, an easy to handle and easy to install unit is provided. The casing 26 may for example be made of plastic or aluminum or any other types of structural material. The casing 26 may comprise one or more hatches that can be opened to perform maintenance and/or repairs on the components of the thermal management unit 1.

Figure 3:
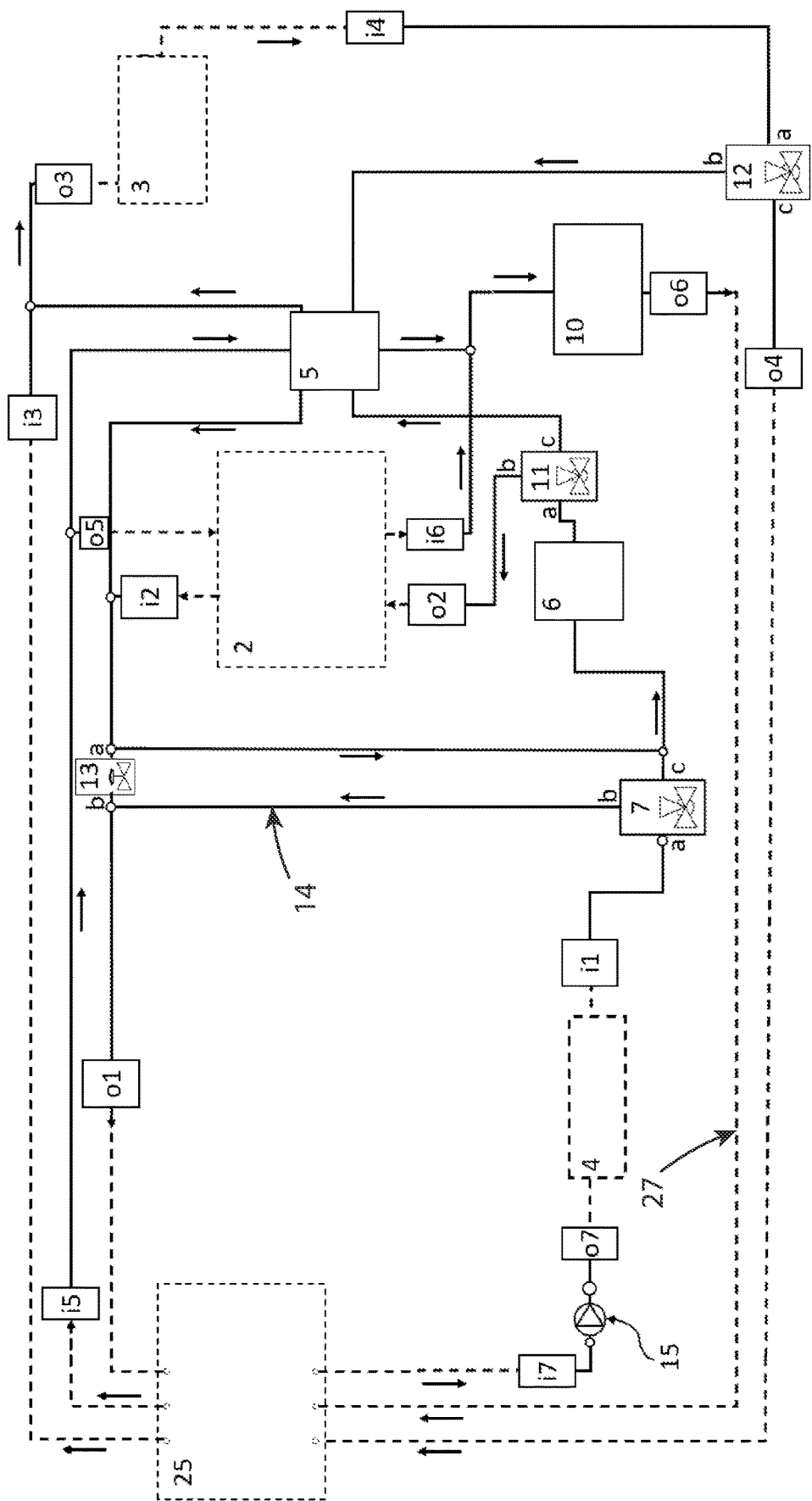
FIG. 3 shows a schematic diagram of an example thermal management unit with an added pump.

FIG. 3 shows a schematic diagram of an example thermal management unit 1 with an added pump. The thermal management unit 1 may comprise a seventh input port i7 for connecting external pipes to receive thermal fluid and a seventh output port o7 for connecting external pipes to output thermal fluid, the seventh input port i7 is connected via the piping 14 to the seventh output o7 port via a first pump 15. The thermal management unit 1 may thus comprise at least one pump for pumping thermal fluid. In other words, the pump is used to pump thermal fluids in the piping 14. With at least one pump in the unit, the need for external pumps is reduced or eliminated.

Figure 4:
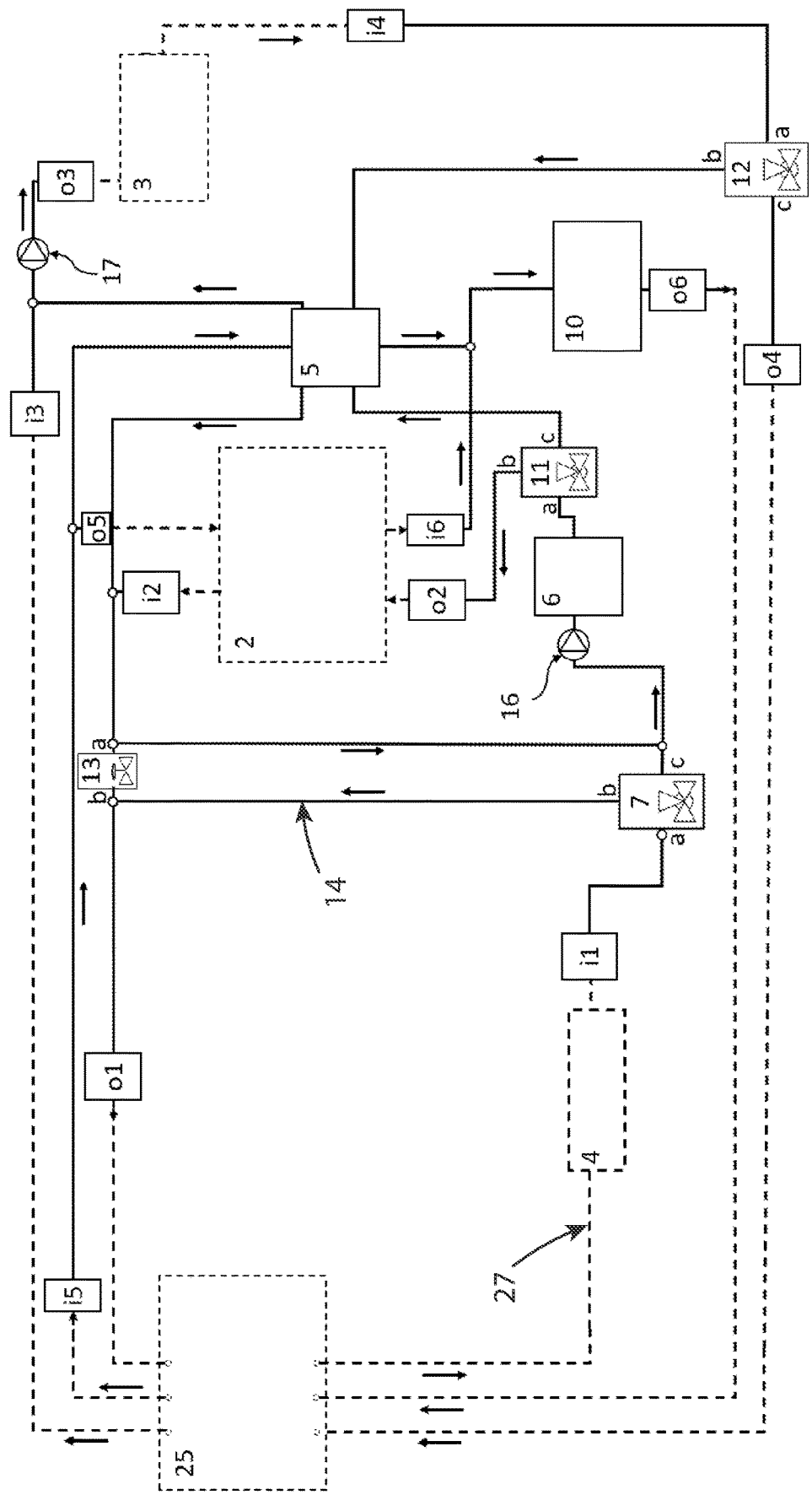
FIG. 4 shows a schematic diagram of an example thermal management unit with two added pumps.

FIG. 4 shows a schematic diagram of an example thermal management unit 1 with two added pumps. The second outlet 7c of the first three-way valve 7 may be connected via the piping 14 to the input port 11a of the second three-way valve 11 via a second pump 16 and the heater 6. The third input port i3 may be connected via the piping 14 to the third output port o3 via a third pump 17. With this, at least one pump is arranged in the unit for controlling the flow of thermal fluid.

Accordingly, there are several possible placements for pumps in the unit. The unit may be without a pump. In such a case, a pump will be needed externally for the thermal management unit 1. The unit may also have one or more of the above pumps. The unit may also have more pumps than described above.

It should be noted that all three of the above-described pumps may be individually added to the unit. Thus, the thermal management unit may comprise one of any of the above pumps, two of any of the above pumps or all three of the above pumps. The thermal management unit may also comprise more than three pumps, or pumps arranged in other places than the three examples of pumps as described above.

Figure 5:
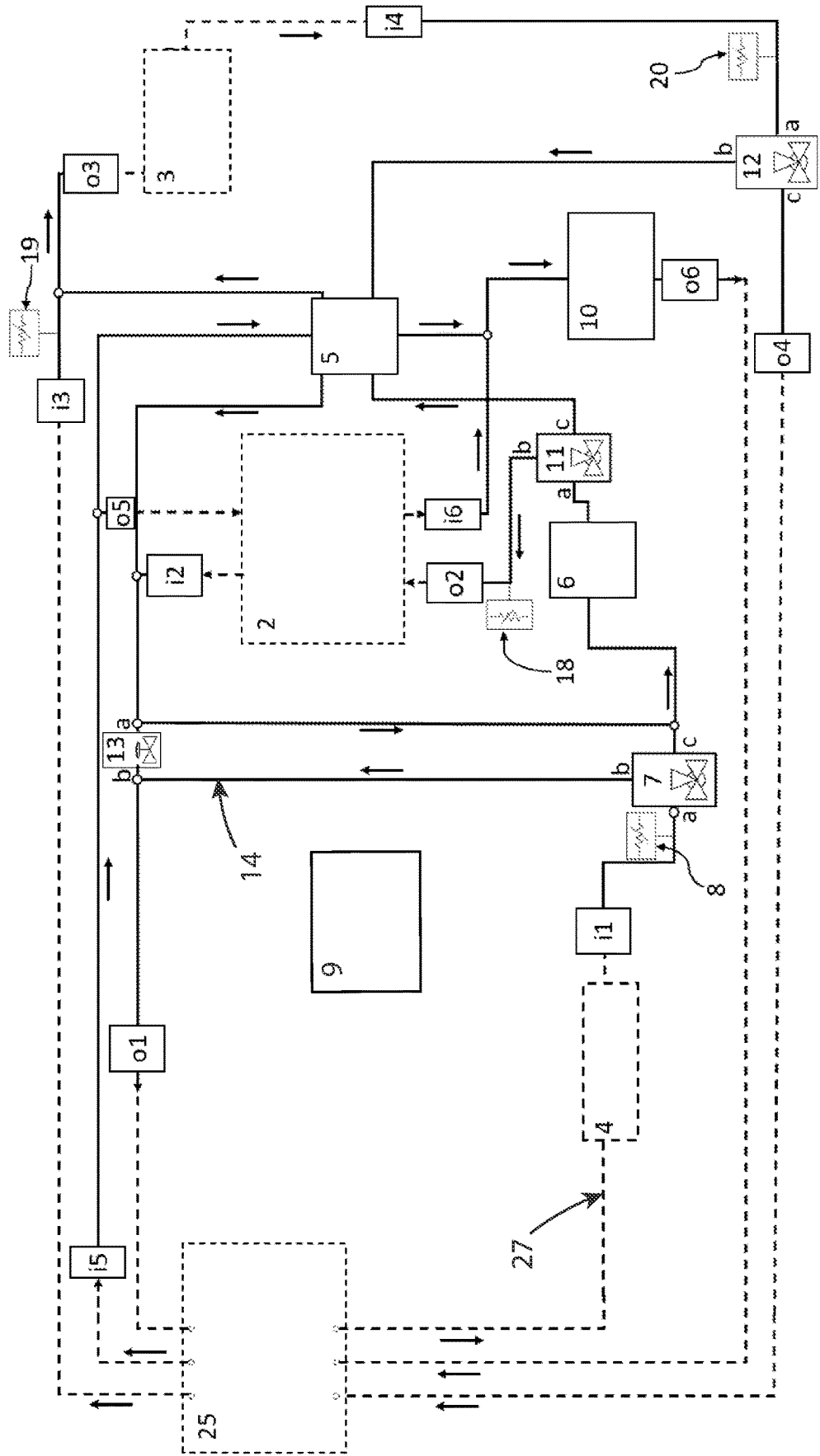
FIG. 5 shows a schematic diagram of an example thermal management unit with temperature sensors.

FIG. 5 shows a schematic diagram of thermal management system comprising an example thermal management unit 1 with temperature sensors. The temperature sensors may be used in a control system for determining how to control opening and closing of valves and the speed of any pumps in the unit. As with the pumps, the temperature sensors may be added individually from each other. It may also be that the thermal management unit 1 comprises no temperature sensors. In such a case, the valves and/or pumps may be controlled based on sensors arranged externally of the thermal management unit 1. Thus, the temperature sensors described below may be added to the unit independently of each other.

The thermal management unit 1 may comprise a first temperature sensor 8. The first temperature sensor 8 is arranged to sense the temperature of the thermal fluid in the piping between the first input port i1 and the inlet 7a of the first three-way valve 7. The first input port is intended to be connected to piping comprising thermal fluid which has been used to cool the vehicle component 4. With a temperature sensor 8 arranged to sense the temperature of the thermal fluid, a control unit 9 may control the first three-three-way valve 7 to direct excess heat from the vehicle component 4 to the heater 6 and to the cabin 2 or energy storage system 3. It should be noted that there may be a temperature sensor present in the cooling system of the vehicle component 4. Then there is no need for a temperature sensor 8 in the unit for detecting the same temperature.

The thermal management system comprises a control unit 9 arranged to control the opening and closing of the inlet 7a and outlets 7b-c of the first three-way valve 7, the inlet 11a and outlets 11b-c of the second three-way valve 11, the inlet 12a and outlets 12b-c of the third three-way valve 12, and the inlet 13a and outlet 13b of the two-way valve 13. The control unit 9 is illustrated in FIG. 5 and may or may not be part of the thermal management unit. The control unit 9 comprises processing circuitry for processing data and communication circuitry for receiving sensor data and sending instructions to the components it is controlling. The control unit 9 may be arranged to control the inlets and outlets of the valves and the speed of any pumps in the unit. The control unit 9 may also be arranged to communicate with the electric vehicle and receive instructions, give feedback to the electric vehicle, as well as receive and transmit states of the electric vehicle and the thermal management unit and potential errors in the thermal management unit or the used components. It should be noted that a control unit 9 can be used in combination with any variant of the thermal management unit 1.

As has been made clear, the thermal management system is intended to be used in an electric vehicle. As can be seen in the figures, the electric vehicle comprises a cabin 2, an energy storage system 3, a vehicle component 4, vehicle piping 27 for thermal fluid, a passive cooling system 25 and the thermal management system. When the thermal management system is arranged in an electric vehicle, the first input port i1 is connected via the vehicle piping 27 to the first output port o1 via the vehicle component 4 and the passive cooling system 25. The first input port i1 thus receives thermal fluid from cooling the vehicle component. The second input port i2 is connected via the vehicle piping 27 to the second output port o2 via the cabin 2. The second input port i2 is thus arranged to receive thermal fluid that has been used for heating the cabin 2. The third input port i3 is connected via the vehicle piping 27 to the fourth output port o4 via the passive cooling system 25. The third input port i3 thus receives thermal fluid from the passive cooling system 25. The fourth input port i4 is connected via the vehicle piping 27 to the third output port o3 via the energy storage system 3. The fourth input port i4 thus receives thermal fluid from heating or cooling the energy storage system 3. The fifth input port i5 is connected via the vehicle piping 27 to the sixth output port o6 via the passive cooling system 25. The fifth input port i5 thus receives thermal fluid cooled by the passive cooling system 25. The sixth input port i6 is connected via the vehicle piping 27 to the fifth output port o5 via the cabin 2. The sixth input port i6 thus receives thermal fluid which has been used for cooling the cabin.

The thermal management unit 1 may comprise a second temperature sensor 18 arranged to sense the temperature of the thermal fluid in the piping 14 between the first outlet 11b of the second three-way valve 11 and the second output port o2. With this temperature sensor, the temperature of the thermal fluid to be connected to the cabin 2 can be monitored. It should be noted that this temperature sensor may be arranged externally of the thermal management unit, for example in the cabin 2 or it can be a part of the three-way valve 11 or the heater 6. If the temperature here is higher than necessary, the heater 6 may be instructed to heat less or, alternatively, the second outlet 7c of the first three-way valve 7 may be closed and/or the first outlet 11b of the second three-way valve 11 may be closed. If the temperature is too low, the heater 6 may be instructed to heat more, or more excess heat may be directed from the cooling of the vehicle component 4.

The thermal management unit 1 may comprise a third temperature sensor 19 arranged to sense the temperature of the thermal fluid in the piping 14 between the third input port i3 and the third output port o3. The temperature of the thermal fluid to the energy storage system 3 can thus be monitored. If the energy storage system 3 needs cooling or heating, the measured temperature here may be used to control how much heat or cold is directed to the heat exchanger 5 from the heater 6 or cooling unit 10. The temperature sensor may also here be connected externally of the thermal management unit 1.

The thermal management unit 1 may comprise a fourth temperature sensor 20 arranged to sense the temperature of the thermal fluid in the piping 14 between the fourth input port i4 and the inlet 12a of the third three-way valve 12. The temperature of the thermal fluid from the energy storage system 3 can thus be monitored. The measured temperature here can be used to control the third three-way valve 12. If the ambient temperature is enough to cool the energy storage system 3, the third three-way valve 12 may be controlled to direct the thermal fluid to the external passive cooling system 25. If additional heating or cooling is required, the thermal fluid is directed towards the heat exchanger 5. A combination of both is also possible.

Figure 6:
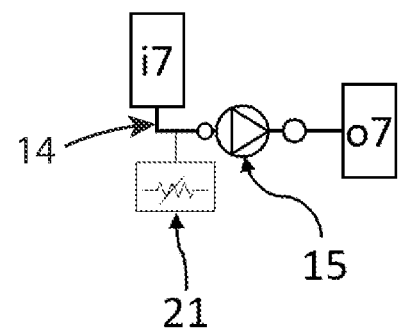
FIG. 6 shows a schematic diagram of an example part of a thermal management unit with an added input port, output port and a pump therebetween.

FIG. 6 shows a schematic diagram of an example part of a thermal management unit 1 with an added input port, output port and a pump therebetween as shown in part of FIG. 3. In FIG. 6, a temperature sensor 21 is arranged between the seventh input port i7 and the first pump 15. Thus, the thermal management unit 1 may comprise a fifth temperature sensor 21 arranged to sense the temperature of the thermal fluid in the piping 14 between the seventh input port i7 and the first pump 15. The temperature of the thermal fluid to the vehicle component 4 can thus be monitored. The measured temperature may be used to control the speed of the pump so that the cooling provided to the vehicle component 4 is controlled.

Figure 7:
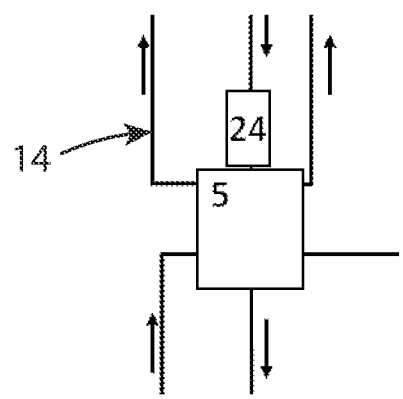
FIG. 7 shows a schematic diagram of an example part of a thermal management unit with a thermal expansion valve arranged before a heat exchanger.

FIG. 7 shows a schematic diagram of an example part of a thermal management unit 1 with a thermal expansion valve 24 arranged before the heat exchanger 5. The thermal management unit 1 may comprise a thermal expansion valve 24 arranged between the fifth input port i5 and the heat exchanger 5. The thermal expansion valve 24 controls the amount of refrigerant released into the evaporator and is intended to regulate the superheat of the vapor leaving the evaporator. The thermal expansion valve 24 may also be integrated in the heat exchanger 5 or a thermal expansion valve may be arranged externally before the fifth input port i5.

Figure 8:
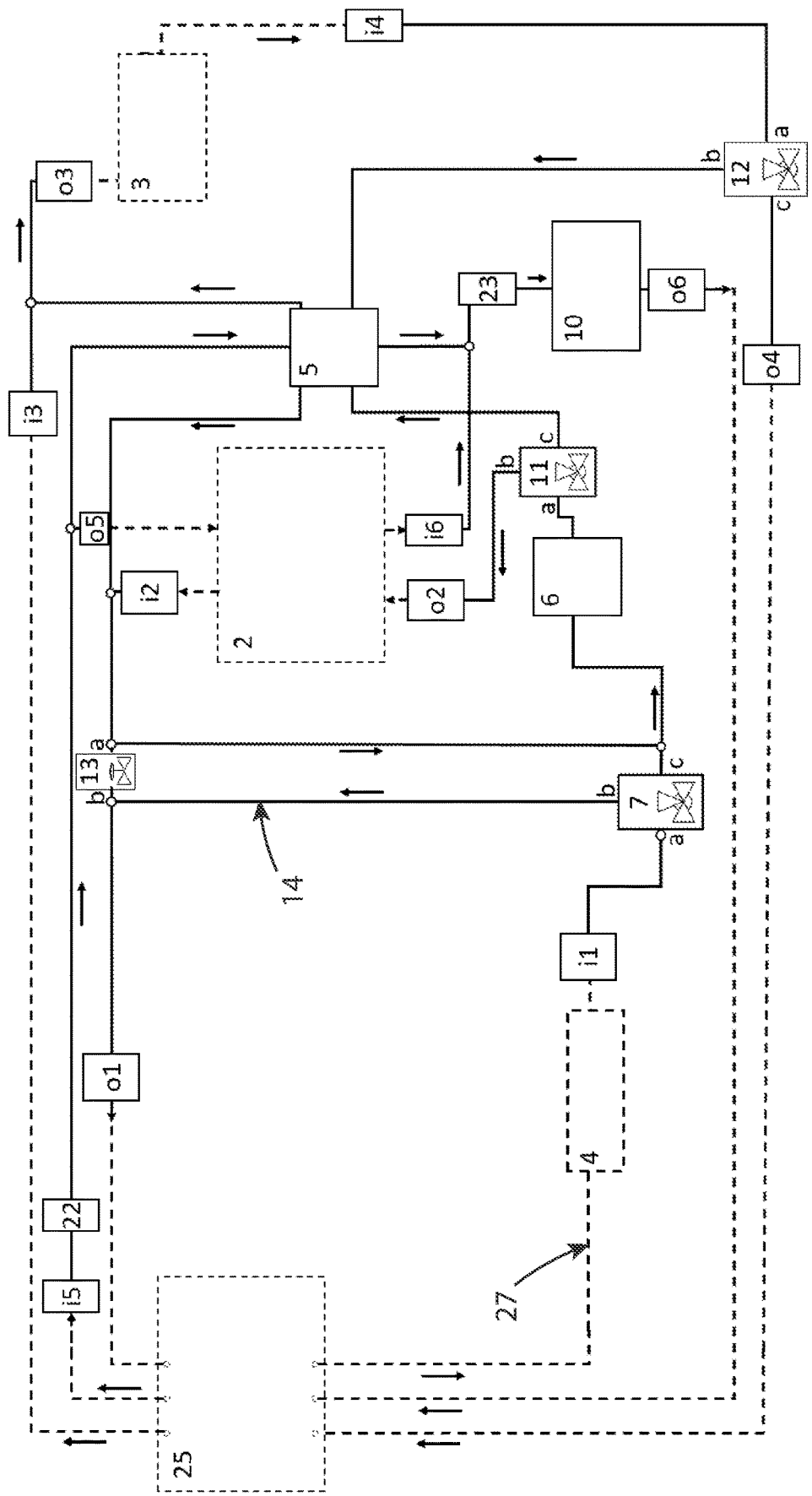
FIG. 8 shows a schematic diagram of an example thermal management unit with pressure sensors.

FIG. 8 shows a schematic diagram of an example thermal management unit 1 with pressure sensors. The thermal management unit 1 may comprise a first pressure sensor 22 arranged to sense the pressure of the thermal fluid in the piping 14 between the fifth input port i5 and both of the fifth output port o5 and the heat exchanger 5. The pressure sensor is indicative of the temperature if the piping 14 is transporting refrigerant gas, in other words, if the thermal fluid is a refrigerant gas. The pressure sensor 22 may also be arranged externally before the fifth input port i5. A control unit 9, as illustrated in FIG. 5, can use input from the pressure sensor to control the thermal expansion valve 24 and/or the cooling unit 10. The thermal management unit 1 may comprise a second pressure sensor 23 arranged to sense the pressure of the thermal fluid in the piping 14 between the cooling unit 10 and both of the sixth input port i6 and the heat exchanger 5. A control unit 9 can use input from the pressure sensor to control the cooling unit 10. As with the temperature sensors and pumps described above, the pressure sensors may be added individually to each other and may also be arranged externally of the thermal management unit 1.

When the thermal fluid is a refrigerant gas, it is for example R134a or R1234YF or similar. It should be noted that different parts of the piping 14 may hold different types of thermal fluid, such as glycol coolant, water, or refrigerant gas. In general, piping 14 that transport thermal fluid for cooling has refrigerant gas and piping 14 for heating comprises a thermal liquid. But other solutions are possible.

The control unit may comprise priority management in order to be able to prioritize battery cooling/heating before cabin heating/cooling and vice versa.

Figure 9:
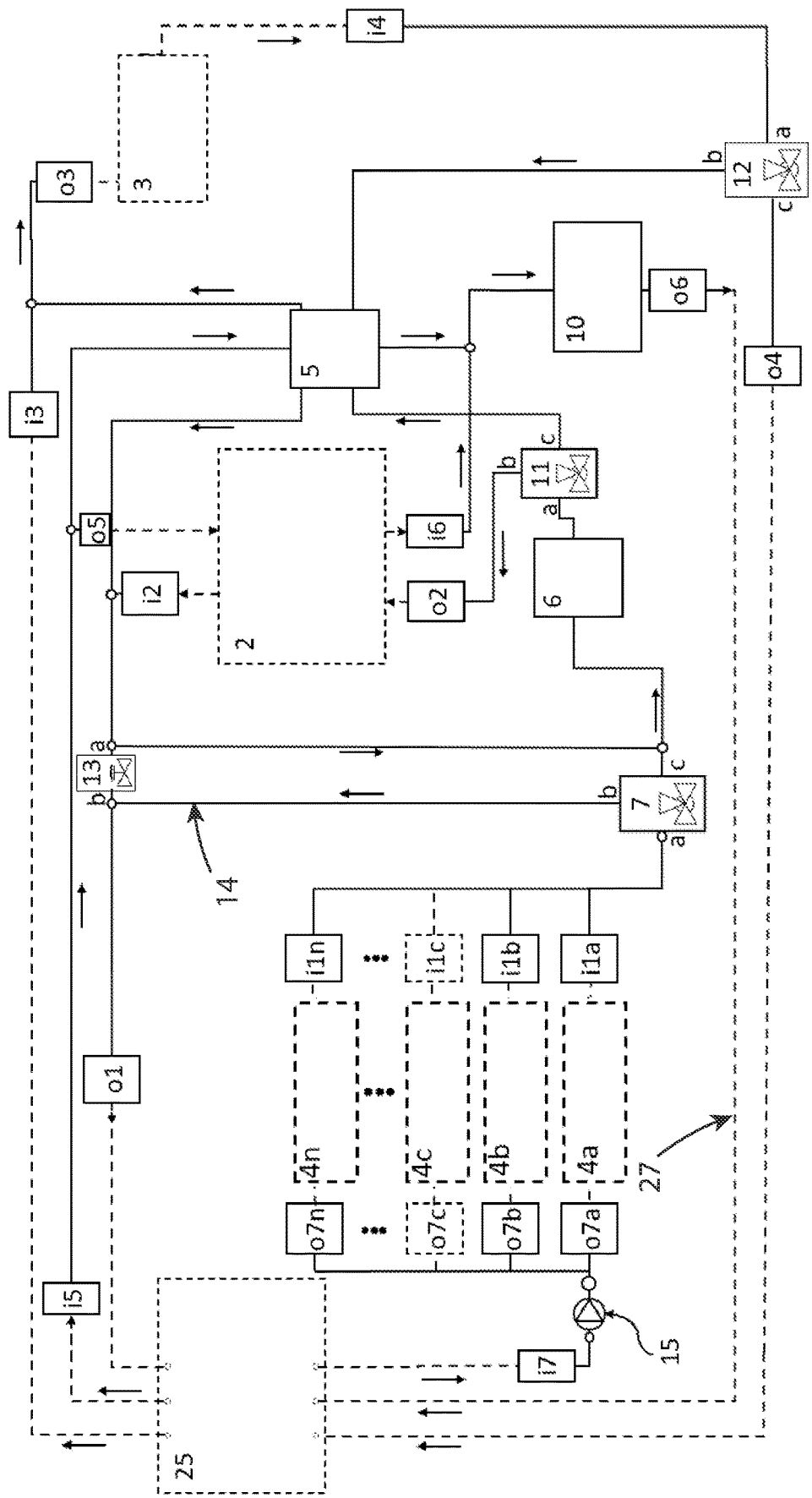
FIG. 9 shows a schematic diagram of an example thermal management unit with input and output ports for connecting several subsystems for cooling a vehicle component or other parts of the electric vehicle.

It should be noted that the vehicle component 4 may comprise more than one component with separate cooling piping 4a, 4b, . . . , 4n, as shown in FIG. 9. In such a case, the first input port i1 may comprise a plurality of first input ports i1a, i1b, . . . , i1n all connected via the piping 14 to the inlet 7a of the first three-way valve 7. Each input port i1a, i1b, i1n is then to receive thermal fluid from a respective cooling piping of the vehicle component.

FIG. 9 shows a schematic diagram of an example thermal management unit 1 with input and output ports for connecting several components with separate cooling piping 4a, 4b, 4n. This is useful in a case where the vehicle component of the electric vehicle comprises more than one component with separate cooling piping 4a, 4b, 4n. Then each one can be connected individually to the thermal management unit.

The seventh output port o7 may also comprises a plurality of seventh output ports o7a, o7b, . . . , o7n. In this case, there may be arranged additional pumps between the seventh input port i7 and the plurality of seventh output ports o7a-n. There may also be valves arranged to control the flow of thermal fluid to the plurality of seventh output ports o7.

Figure 10:
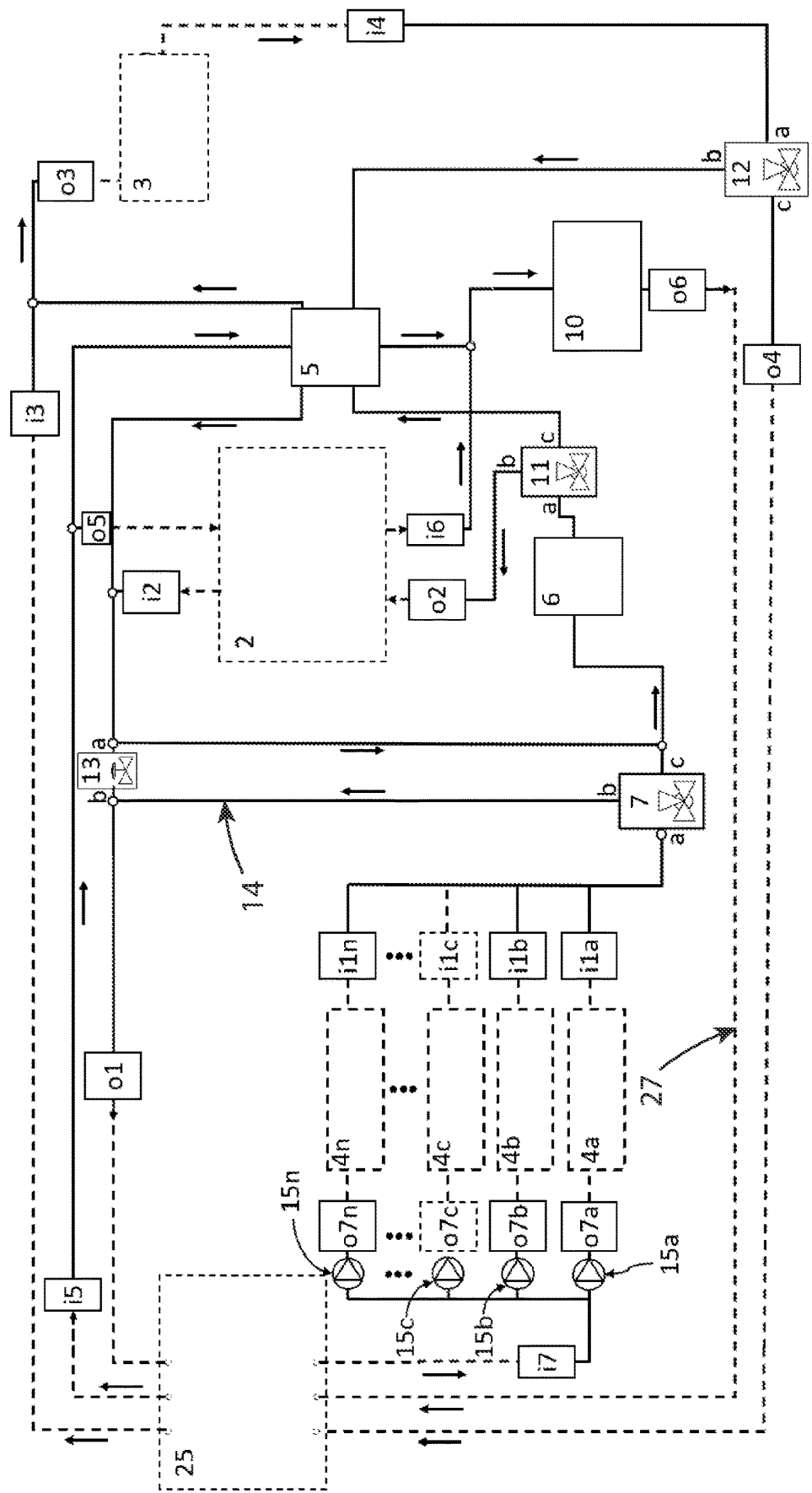
FIG. 10 shows the example of FIG. 9 with a pump at each subsystem.

FIG. 10 shows the example of FIG. 9 with a pump 15a, 15b, . . . , 15n at each component with separate cooling piping 4a, 4b, . . . , 4n. In other words, the thermal management unit 1 may comprise a pump 15a, 15b, . . . , 15n before each of the output ports o7a, o7b, . . . , o7n. There may also be one or more controllable valves arranged before the output ports o7a, o7b, . . . , o7n so that it is controllable which of the several vehicle components with separate cooling piping 4a, 4b, . . . , 4n are used.

The thermal management unit 1 may also comprise one or more expansion tanks. Expansion tanks are designed to handle thermal expansion of thermal fluid as it heats up, thus preventing excessive pressure as well as acting as coolant reservoir in case of smaller leakages in the system.

The invention claimed is:

1. A thermal management unit for controlling the temperature in an electric vehicle, the unit comprising:
   a. a heater for heating thermal fluid,
   b. a cooling unit,
   c. a heat exchanger,
   d. a first input port, a second input port, a third input port, a fourth input port, a fifth input port and a sixth input port for connecting external pipes to receive thermal fluid,
   e. a first output port, a second output port, a third output port, a fourth output port, a fifth output port and a sixth output port for connecting external pipes to output thermal fluid,
   f. a first three-way valve comprising an inlet, a first outlet and a second outlet, a second three-way valve including an inlet, a first outlet and a second outlet, and a third three-way valve including an inlet, a first outlet and a second outlet,
   g. a two-way valve comprising an inlet and an outlet,
   h. piping for thermal fluid,
   wherein,
   the first input port is connected via the piping to the inlet of the first three-way valve,
   the first outlet of the first three-way valve is connected via the piping to the first output port and the second outlet of the first three-way valve is connected via the piping to the input port of the second three-way valve via the heater,
   the first outlet of the second three-way valve is connected via the piping to the second output port and the second outlet of the second three-way valve is connected via the piping to the inlet of the two-way valve via the heat exchanger, the outlet of the two-way valve is connected via the piping to the first output port,
   wherein the piping between the heat exchanger and the inlet of the two-way valve is also connected to the second input port and to the piping between the second outlet of the first three-way valve and the heater,
   the third input port is connected via the piping to the third output port,
   the fourth input port is connected via the piping to the inlet of the third three-way valve, the first outlet port of the third three-way valve is connected to the piping between the third input port and the third output port via the heat exchanger, and the second outlet of the third three-way valve is connected via the piping to the fourth output port,
   the fifth input port to the fifth output port and to the sixth output port via the heat exchanger and the cooling unit, wherein the sixth input port is connected to the piping between the heat exchanger and the cooling unit.

2. The thermal management unit according to claim 1, comprising a casing and wherein all components of the thermal management unit are arranged in the casing, and wherein the input ports and output ports are openings in the casing.

3. The thermal management unit according to claim 1, comprising a seventh input port for connecting external pipes to receive thermal fluid and a seventh output port for connecting external pipes to output thermal fluid, the seventh input port is connected via the piping to the seventh output port via a first pump.

4. The thermal management unit according to claim 1, wherein the second outlet of the first three-way valve is connected via the piping to the input port of the second three-way valve via a second pump and the heater.

5. The thermal management unit according to claim 1, wherein the third input port is connected via the piping to the third output port via a third pump.

6. The thermal management unit according to claim 1, comprising a first temperature sensor arranged to sense the temperature of the thermal fluid in the piping between the first input port and the inlet of first third three-way valve.

7. The thermal management unit according to claim 1, comprising a second temperature sensor arranged to sense the temperature of the thermal fluid in the piping between the first outlet of the second three-way valve and the second output port.

8. The thermal management unit according to any claim 1, comprising a third temperature sensor arranged to sense the temperature of the thermal fluid in the piping between the third input port and the third output port.

9. The thermal management unit according to claim 1, comprising a fourth temperature sensor arranged to sense the temperature of the thermal fluid in the piping between the fourth input port and the inlet of the third three-way valve.

10. The thermal management unit according to claim 3, comprising a fifth temperature sensor arranged to sense the temperature of the thermal fluid in the piping between the seventh input port and the first pump.

11. The thermal management unit according to claim 1, comprising a thermal expansion valve arranged between the fifth input port and the heat exchanger.

12. The thermal management unit according to claim 1, comprising a first pressure sensor arranged to sense the pressure of the thermal fluid in the piping between the fifth input port and both of the fifth output port and the heat exchanger.

13. The thermal management unit according to claim 1, comprising a second pressure sensor arranged to sense the pressure of the thermal fluid in the piping between the cooling unit and both of the sixth input port and the heat exchanger.

14. A thermal management system comprising the thermal management unit according to claim 1, and a control unit arranged to control the opening and closing of the inlet and outlets of the first three-way valve, the inlet and outlets of the second three-way valve, the inlet and outlets of the third three-way valve, and the inlet and outlet of the two-way valve.

15. An electric vehicle comprising a cabin, an energy storage system, a vehicle component, vehicle piping for thermal fluid, a passive cooling system and the thermal management system according to claim 14, wherein:
the first input port is connected via the vehicle piping to the first output port via the vehicle component and the passive cooling system
the second input port is connected via the vehicle piping to the second output port via the cabin,
the third input port is connected via the vehicle piping to the fourth output port via the passive cooling system,
the fourth input port is connected via the vehicle piping to the third output port via the energy storage system,
the fifth input port is connected via the vehicle piping to the sixth output port via the passive cooling system,
the sixth input port is connected via the vehicle piping to the fifth output port via the cabin.

\* \* \* \* \*